(12) United States Patent
Hong et al.

(10) Patent No.: US 9,734,538 B2
(45) Date of Patent: Aug. 15, 2017

(54) INTEGRATED OPERATION METHOD FOR SOCIAL NETWORK SERVICE FUNCTION AND SYSTEM SUPPORTING THE SAME

(75) Inventors: Sung Soo Hong, Seoul (KR); Sahng Hee Bahn, Gyeonggi-do (KR); Chang Hwan Hwang, Seoul (KR)

(73) Assignee: Samsung Electronics Co., Ltd (KR)

(*) Notice: Subject to any disclaimer, the term of this patent is extended or adjusted under 35 U.S.C. 154(b) by 973 days.

(21) Appl. No.: 13/591,955

(22) Filed: Aug. 22, 2012

(65) Prior Publication Data
US 2013/0073626 A1 Mar. 21, 2013

(30) Foreign Application Priority Data
Sep. 16, 2011 (KR) ......................... 10-2011-0093169

(51) Int. Cl.
G06F 15/16 (2006.01)
G06Q 50/00 (2012.01)
G06Q 10/10 (2012.01)

(52) U.S. Cl.
CPC ............. G06Q 50/01 (2013.01); G06Q 10/10 (2013.01)

(58) Field of Classification Search
CPC ...................................................... G06Q 50/01
USPC .......................................................... 709/219
See application file for complete search history.

(56) References Cited

U.S. PATENT DOCUMENTS 7,673,327 B1 3/2010 Polis et al.
8,156,183 B2* 4/2012 Polis ....................... H04L 67/02
709/203
8,872,844 B2* 10/2014 Greiner ............... G06F 19/3406
345/440
2006/0223503 A1 10/2006 Muhonen et al.
2009/0058885 A1* 3/2009 Park ...................... G06T 3/4092
345/668

(Continued)

FOREIGN PATENT DOCUMENTS

JP 2008-140353 6/2008
KR 1020070120719 12/2007

(Continued)

OTHER PUBLICATIONS

Bouman, Amber. "Windows Phone 7: Twitter, HTML5, Multitasking coming in March update". Feb. 14, 2011. Maximum PC. pp. 1-3.*

(Continued)

*Primary Examiner* — Imad Hussain
(74) *Attorney, Agent, or Firm* — The Farrell Law Firm, P.C.

(57) ABSTRACT

Provided are a Social Network Service (SNS) function integration operation method and a system supporting the same. The SNS function integration operation system, includes a plurality of SNS servers providing a plurality of SNS information; and a portable terminal for subscribing to the plurality of SNS servers in order to receive the plurality of SNS information and provide a plurality of SNS functions corresponding to the plurality of SNS information, and providing at least one of an SNS integration operation user interface that integrates a list of the plurality of SNS functions and the plurality of SNS information, and for providing an SNS information screen corresponding to a detailed view of SNS information selected from the plurality of SNS information.

18 Claims, 11 Drawing Sheets

(56) References Cited

U.S. PATENT DOCUMENTS

| | | | | |
|---|---|---|---|---|
| 2009/0167774 A1* | 7/2009 | Want | G06F 3/1431 | 345/543 |
| 2009/0209286 A1* | 8/2009 | Bentley | H04L 12/588 | 455/556.1 |
| 2009/0271247 A1* | 10/2009 | Karelin | G06Q 10/10 | 705/319 |
| 2010/0114788 A1 | 5/2010 | White et al. | | |
| 2010/0138780 A1* | 6/2010 | Marano | G06F 3/1415 | 715/804 |
| 2010/0199340 A1* | 8/2010 | Jonas | G06Q 10/10 | 726/8 |
| 2010/0299436 A1* | 11/2010 | Khalid | G06F 1/1643 | 709/226 |
| 2011/0074670 A1 | 3/2011 | Teegan et al. | | |
| 2011/0179126 A1* | 7/2011 | Wetherell | H04L 51/36 | 709/206 |
| 2011/0197163 A1* | 8/2011 | Jegal | G06F 3/0482 | 715/811 |
| 2011/0202852 A1* | 8/2011 | Jeong | G06Q 10/107 | 715/751 |
| 2011/0246904 A1* | 10/2011 | Pinto | G06F 9/4445 | 715/740 |
| 2011/0279354 A1* | 11/2011 | Tang | G06F 9/4443 | 345/3.2 |
| 2012/0072609 A1* | 3/2012 | Rajamani | H04N 21/4122 | 709/231 |
| 2012/0098919 A1* | 4/2012 | Tang | H04N 7/148 | 348/14.03 |
| 2012/0172088 A1* | 7/2012 | Kirch | G06F 1/1626 | 455/557 |
| 2012/0226985 A1* | 9/2012 | Chervets | G06F 9/4445 | 715/735 |
| 2015/0100377 A1* | 4/2015 | Penumaka | G06Q 30/0201 | 705/7.29 |
| 2015/0199650 A1* | 7/2015 | Shenoy | G06Q 10/10 | 705/7.18 |

FOREIGN PATENT DOCUMENTS

| | | |
|---|---|---|
| KR | 1020100007435 | 1/2010 |
| KR | 1020110093528 | 8/2011 |
| KR | 1020110093630 | 8/2011 |
| WO | WO 2008/013628 | 1/2008 |
| WO | WO 2011/099796 | 8/2011 |

OTHER PUBLICATIONS

"Patent & Utility MOdel Number Search (Detail)". Machine translation of JP 2008-140353 A. Retrieved Dec. 9, 2015. Original document published Jun. 19, 2008. pp. 1-6.*

Guido, "TVOut2", Aug. 4, 2010. pp. 1-2.*

European Search Report dated May 18, 2015 issued in counterpart application No. 12831187.5-1955.

* cited by examiner

FIG. 3

| Service Name | Validation | SNS ID | SNS pw | SNS Profile Picture |
|---|---|---|---|---|
| Facebook | YES | media.ray.hong@gmail.com | XXXXXXX | Profile Photo |
| Cyworld | YES | Shady1899@gmail.com | XXXXXXX | Profile Photo |
| YouTube | YES | rayhong | XXXXX | Profile Photo |
| ... | ... | ... | ... | ... |

FIG. 10
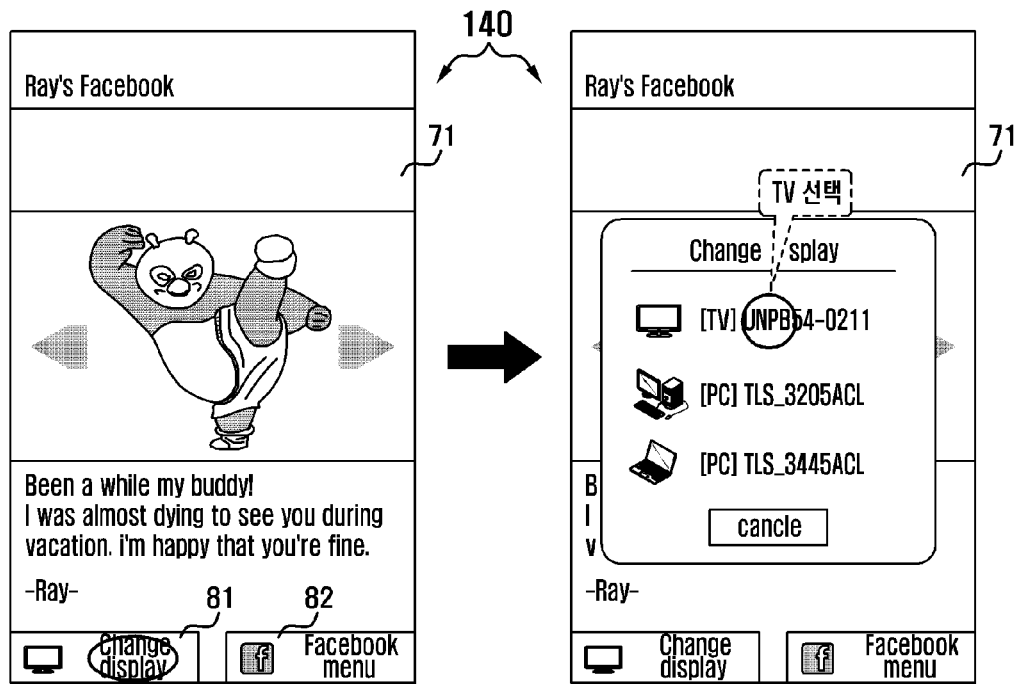
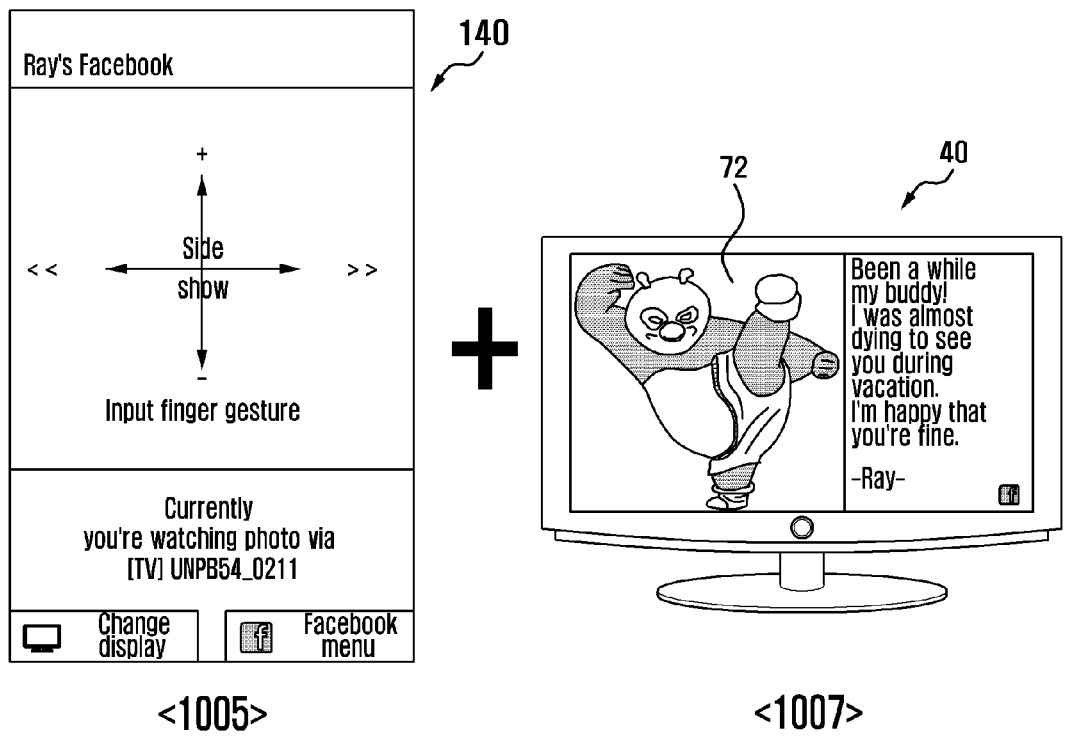

INTEGRATED OPERATION METHOD FOR SOCIAL NETWORK SERVICE FUNCTION AND SYSTEM SUPPORTING THE SAME

PRIORITY

This application claims priority under 35 U.S.C. §119(a) to Korean Patent Application Serial No. 10-2011-0093169, which was filed in the Korean Intellectual Property Office on Sep. 16, 2011, the entire contents of which is incorporated herein by reference.

BACKGROUND OF THE INVENTION

1. Field of the Invention

The present invention relates generally to a Social Network Service (SNS) function, and more particularly, to an SNS function integration operation method such that a plurality of SNS functions are integrally managed and operated and various electronic devices may operate the SNS function, and a system supporting the same.

2. Description of the Related Art

A portable terminal supports a call function based on mobility and has been used for many various purposes due to convenient utility and easy portability. Conventional portable terminals support various user functions, such as a file playback function, a file search function, a camera function, voice or image call function, a web access function during movement, etc. Conventional portable terminals also support a message service function based on a mobile communication module, and support a Social Network Service (SNS) function based on a web access function. The SNS function enables an SNS server to share information with other terminals connecting to the SNS server or capable of using the SNS server based on a certain SNS server. Such an SNS function is supported by various SNS servers, and respective servers provide various user interfaces. A conventional portable terminal user may subscribe to a particular SNS server, install an application program provided from a corresponding SNS server, and use information transmission or information sharing based on the application program.

A user may subscribe to various SNS servers using a portable terminal while using the SNS function, and accordingly may use respective SNS functions based on user interfaces provided from various SNS servers. Therefore, when a plurality of SNS servers use provided SNS functions, the user operates respective SNS functions based on user interfaces provided from the respective SNS servers. Accordingly, it is inconvenient for a user to manage various user interfaces. Further, in order to operate an SNS function provided from a certain SNS server, the user must constantly write and upload information to a user interface provided from a corresponding SNS server. Such work can be inconvenient, since the user must repeatedly write and upload the information to respective user interfaces when a plurality of SNS functions is operated by the same user.

The user may use a portable terminal to use SNS functions. However, because the size of a display unit in a portable terminal is limited, it is difficult for the portable terminal to output various information at one time. Accordingly, the user must repeatedly provide various inputs to the portable terminal in order to search all information output on the limited display unit.

SUMMARY OF THE INVENTION

The present invention has been made in view of the above problems, and provides an integrated operation method for an SNS function that allows a user to conveniently operate a plurality of SNS functions by integrally managing and operating various SNS functions, and a system supporting the same.

The present invention further provides an integrated operation method for an SNS function that allows a user to easily search and manage information by providing a user interface for supporting an SNS function to various electronic devices, and a system supporting the same.

In accordance with an aspect of the present invention, a Social Network Service (SNS) function integration operation system is provided. The system includes a plurality of SNS servers providing a plurality of SNS information; and a portable terminal for subscribing in to the plurality of SNS servers in order to receive the plurality of SNS information and provide a plurality of SNS functions corresponding to the plurality of SNS information, and providing at least one of an SNS integration operation user interface that integrates a list of the plurality of SNS functions and a the plurality of SNS information supported from the SNS functions, and for providing an SNS information screen corresponding to a detailed view of SNS information selected from the plurality of SNS information.

In accordance with another aspect of the present invention, a Social Network Service (SNS) function integration operation method is provided. The method includes receiving a plurality of SNS information from a plurality of SNS servers by a portable terminal; and outputting at least one of an SNS integration operation user interface integrating a list of the plurality of SNS functions corresponding to the plurality of SNS information provided from the plurality of SNS servers, and an SNS information screen corresponding to a detailed view of SNS information selected from the plurality of SNS information by the portable terminal.

In accordance with another aspect of the present invention, a Social Network Service (SNS) function integration operation method is provided. The method includes receiving, by a portable terminal from at least one SNS server, a plurality of SNS information from at least one SNS server; transferring, to an electronic device by the portable terminal, at least one of an SNS integration operation user interface that integrates a list of the plurality of SNS functions corresponding to the plurality of SNS information provided from the plurality of SNS servers, and an SNS information screen corresponding to a detailed view of SNS information selected from the plurality of SNS information; and outputting, by the electronic device, the transferred at least one of the SNS integration operation user interface and the SNS information screen.

BRIEF DESCRIPTION OF THE DRAWINGS

The objects, features and advantages of the present invention will be more apparent from the following detailed description in conjunction with the accompanying drawings, in which:

FIG. 3 is a diagram illustrating an example of an account table stored in a memory;

FIG. 10 is a diagram illustrating a user interface in an SNS function integration operation system according to another embodiment of the present invention.

DETAILED DESCRIPTION OF EMBODIMENTS OF THE PRESENT INVENTION

Embodiments of the present invention are described in detail as follows with reference to the accompanying drawings. The same reference numbers are used throughout the drawings to refer to the same or like parts. Detailed descriptions of well-known functions and structures incorporated herein may be omitted to avoid obscuring the subject matter of the present invention.

Figure 1:
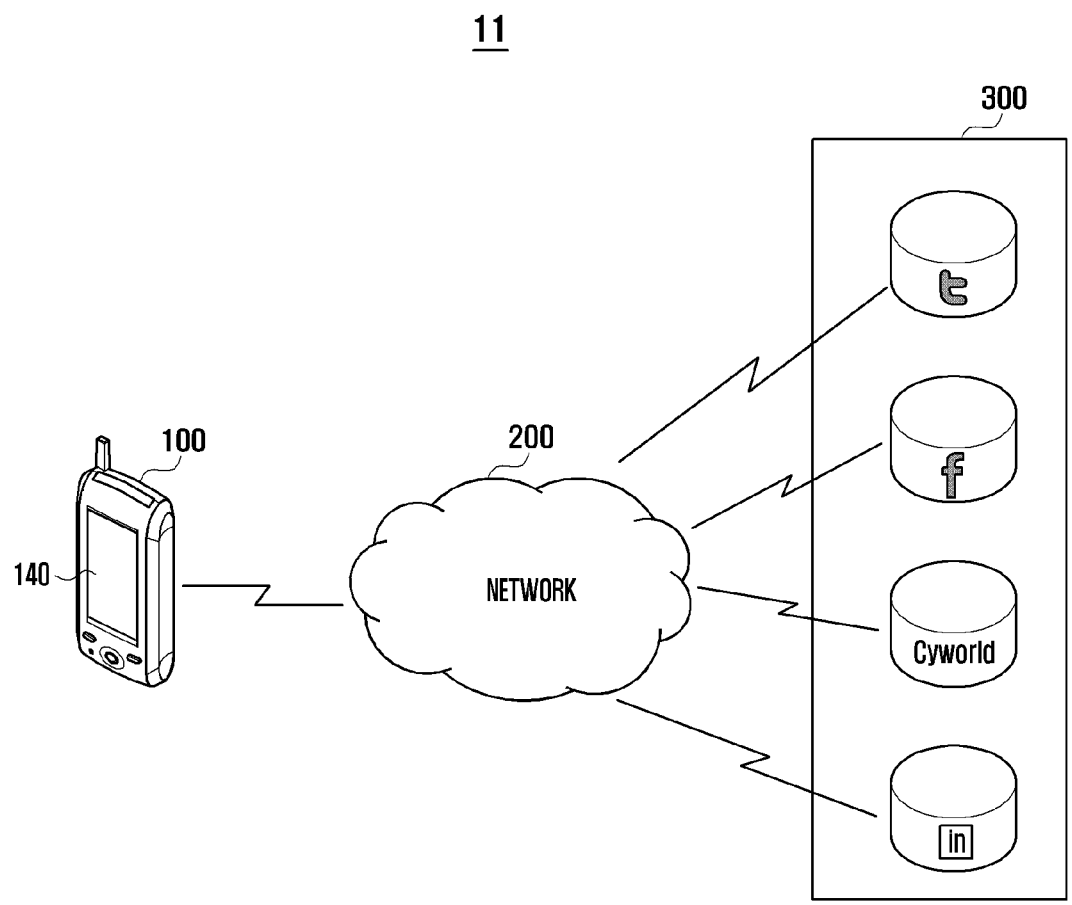
FIG. 1 is a diagram illustrating a configuration of an SNS function integration operation system supporting an integrated management and operation according to an embodiment of the present invention.

FIG. 1 is a diagram illustrating a configuration of an SNS function integration operation system supporting an integrated management and operation according to an embodiment of the present invention.

Referring to FIG. 1, the SNS function integration operation system according to an embodiment of the present invention includes a portable terminal 100, a network 200, and a plurality of SNS servers 300.

In the SNS function integration operation system 11, the portable terminal 100 accesses a plurality of SNS servers 300 through the network 200 and collects SNS information registered in respective SNS servers 300, and then outputs the collected SNS information to a display unit 140 of the portable terminal 100. In this case, the portable terminal 100 may integrally search SNS information provided from a plurality of SNS servers 300, and provide an SNS integration operation user interface to search certain SNS information in detail among the searched SNS information. Accordingly, the first SNS function integration operation system according to embodiments of the present invention may activate respective user interfaces provided from respective SNS servers 300, thereby removing the inconvenience of checking and searching for the presence of new information according to corresponding SNS functions. Instead, various SNS functions that the user has subscribed to may be integrally checked and operated, in order to more easily use SNS functions.

The plurality of SNS servers 300 provides SNS information to the portable terminal 100 through the network 200. The plurality of SNS servers 300 supports various SNS functions according to an operation purpose and intention of each server designer. For example, the SNS server 300s may include servers corresponding to online service providers, such as Facebook, Twitter, Cyworld, or various news services. Each of the SNS servers 300 provides various user interfaces according to services corresponding to each respective service provider. The plurality of SNS servers 300 connect to the network 200, upload and download to and from various registered terminals, and manage registration of new terminals in a server. In particular, the SNS servers 300 may transmit corresponding SNS information to the portable terminal 100 at regular intervals, in real time, or according to SNS information upload events generated by the portable terminal 100.

The network 200, which is disposed between the plurality of SNS servers 300 and the portable terminal 100, supports formation of a communication channel through which the portable terminal 100 accesses the plurality of SNS servers 300. If there is SNS information to be transmitted to the portable terminal 100 among SNS information registered in the plurality of SNS servers 300, the network 200 supports formation of the communication channel in order to transmit the corresponding SNS information to the portable terminal 100. The network 200 is configured by a network device compatible with various communication modules, such as a communication module capable of forming a communication channel with the plurality of SNS servers 300, a communication module capable of forming a communication channel with the portable terminal 100, and a device for transferring signals between the communication modules. In particular, the network 200 may include a network device for transmitting/receiving SNS information with a mobile portable terminal.

The portable terminal 100 accesses plurality of SNS servers 300 through the network 200, and receives SNS information from at least one of the SNS servers 300. When new SNS information is received from the SNS servers 300, the portable terminal 100 may output an alarm indicating reception of the SNS information, and support SNS information under the control of a user. In particular, the portable terminal 100 of the present invention may provide a user interface for integrally managing and operating the plurality of SNS servers 300 registered by the user, in order to easily check which SNS server is providing the new SNS information, and search SNS information provided according to the control of the user. Further, in order to register an SNS server to operate a new SNS function, the portable terminal 100 may remove the necessity of repeatedly entering registration information, since a new SNS server registration may be performed using previously-supplied user relation information including stored account information or designation images such as a portrait image. The configuration of the portable terminal 100 is described in detail herein with reference to FIG. 2.

As described herein, the first SNS function integration operation system 11 according to an embodiment of the present invention may integrate SNS information reception and output of the received SNS information from a plurality of SNS servers 300 registered in the portable terminal 100 in order to easily search the SNS information corresponding to the plurality of SNS servers 300. Further, the first SNS function integration operation system 11 collects and provides various SNS server information to a user. When the user selects an SNS server to which the user wants to subscribe, the system 11 may automatically perform a registration procedure based on the user relation information, in order to simplify the process of subscribing procedure to a server.

Figure 2:
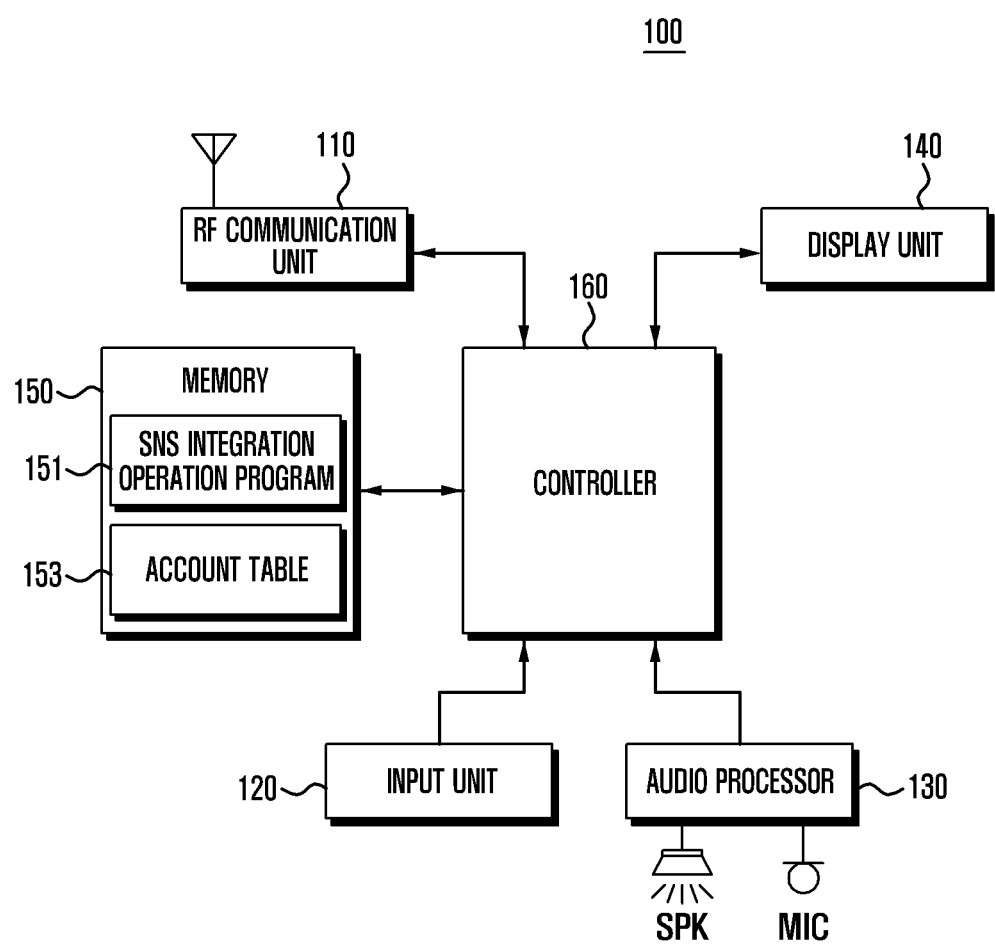
FIG. 2 is a block diagram illustrating a configuration of a portable terminal according to an embodiment of the present invention.

FIG. 2 is a block diagram illustrating a configuration of a portable terminal 100 according to an embodiment of the present invention.

Referring to FIG. 2, a portable terminal 100 according to an embodiment of the present invention may include a Radio Frequency (RF) communication unit 110, an input unit 120, an audio processor 130, a display unit 140, a memory 150, and a controller 160.

The memory 150 includes an SNS integration operation program 151 for supporting registration of various SNS servers, in order for the portable terminal 100 to receive and output SNS information from a plurality of registered SNS servers. Accordingly, the user may check and process SNS information provided from a plurality of SNS servers based on an SNS integration operation user interface provided from one application program.

The RF communication unit 110 forms communication channels for voice call, an image call, and data transmission, such as for transmitting images or messages under the control of the controller 160. More specifically, the RF communication unit 110 forms the voice call channel, the data communication channel, and the image call channel between mobile communication systems. In order to form these channels, the RF communication unit 110 may include a transmitter (not shown) up-converting a frequency of a transmitted signal and amplifying the signal, a receiver (not shown) low-noise-amplifying a received signal and down-converting the signal. The RF communication unit 110 may form a communication channel with a plurality of SNS servers 300 through the network 200. In this procedure, the RF communication unit 110 may sequentially or simultaneously form a communication channel with respect to the plurality of SNS servers 300. The RF communication unit 110 may transmit user information including an IDentification (ID), a password, and photograph information in order to perform registration procedure with respect to a particular SNS server. Moreover, the RF communication unit 110 may receive SNS information from at least one among a plurality of SNS servers 300 during an SNS integration operation, and transfer the received SNS information to the controller 160.

The input unit 120 generates input signals, such as an input signal for activating an SNS integration operation function, an input signal for terminating an SNS integration operation function, and an input signal necessary for the SNS integration operation in the portable terminal 100. The input unit 120 transfers the generated input signals to the controller 160. The input unit 120 includes a plurality of input keys and function keys for receiving input of numerals or character information, and selecting various functions, in particular, user information writing or certain SNS functions. The function keys may include arrow keys, side keys, and hot keys set to initiate certain functions. The input unit 120 may be implemented by a keypad, such as a Qwerty keypad, a 3*4 keypad, or a 4*3 keypad including a plurality of keys, for example. When the display unit 140 is a touch screen, the input unit 120 may be implemented by a Qwerty key map, a 3*4 key map, a 4*3 key map, a menu map, or a control key map output on the display unit 140. When the display unit 140 is a full touch screen (i.e., a touch screen occupying a significant portion of a surface of the portable terminal 100) the input unit 120 may also include side keys formed at a side of a case of the portable terminal 100.

The audio processor 130 is connected to a speaker SPK for playing various audio data, such as audio data transmitted/received during a call, audio data included in a received message, and audio data according to playback of an audio file stored in the memory 150. The audio processor 130 also includes a microphone MIC for collecting a user's voice or other audio signals during the call. The audio processor 130 may output effect sounds or other guide sounds corresponding to an SNS integration operation procedure. For example, if SNS information corresponding to a particular SNS function among a plurality of registered SNS functions is received, the audio processor 130 may output an effect sound or a guide sound indicating reception of the SNS information. Moreover, the audio processor 130 may newly request subscription in a certain SNS function or support output of various effect sounds or guide sounds, when using an SNS function for which permission for such a subscription request is allowed. The audio processor 130 may also suppress or cease the output of the guide and effect sounds according to user settings.

The display unit 140 displays information input by the user or information to be provided to the user as well as various menus of the portable terminal 100. That is, the display unit 140 may provide various screens such as an idle screen, a menu screen, a message creation screen, a call screen, etc. The display unit 140 may be a flat panel display, such as a Liquid Crystal Display (LCD) or an Organic Light Emitted Diode (OLED). The display unit 140 supports output of a user interface for an SNS integration operation, and output of a registration support user interface for registering it into a certain SNS server among a plurality of SNS servers 300. The display unit 140 may be a touch screen in the interposed form between a touch panel and a display panel. In this case, the display unit 140 may act as an input means.

The memory 150 may store information about a key map, a menu map, and a touch lock part release region for an operation of the display unit 140, as well as store applications necessary to perform the functions according to embodiments of the present invention. The key map and the menu map may be various forms. More specifically, the key map may be, for example, a keyboard map, a 3*4 key map, a Qwerty key map, or a control key map for controlling an operation of a currently activated application program. Further, the menu map may be, for example, a menu map for controlling an operation of a currently activated application program. The memory 150 includes a program area and a data area.

The program area stores an Operating System (OS) for booting the portable terminal 100 and for operating structural elements, and application programs for playing various files, such as an application program for supporting a call function of the portable terminal 100, a web browser accessing an Internet server, an Motion Picture Experts Group (MPEG) Audio Layer-3 (MP3) application program for playing other sound sources, an image output application program for playing photographs, a moving image playback application program, and a phone-book support application program. The program area stores the SNS integration operation program 151. When the SNS integration operation function is activated according to a request of the user, the SNS integration operation program 151 is loaded into the controller 160 to support SNS integration functions. The SNS integration operation program 151 may include a routine for collecting a list of SNS servers, and a registration processing routine for automatically registering particular SNS servers based on stored user information. The SNS integration operation program 151 may include a routine for collecting SNS information from a plurality of SNS servers to which the user registers.

The registration processing routine may a sub-routines for outputting a collected list of SNS servers, for retrieving user information stored in a data area when a certain item is selected from a server list and an input requesting registration to an SNS server of the selected list, and for registering the retrieved user information in a corresponding SNS server. The registration processing routine may further include a sub-routine supporting output of an SNS function provided from the registered SNS server through a user interface for an SNS integration operation, and a sub-routine supporting output of a registration support user interface for displaying the SNS server list output and automatic registration procedure.

The output support routine may include an arrangement sub-routine for arranging a list of SNS functions provided from SNS servers to which the user registers in a preset arrangement order, a sub-routine for supporting output of the arranged SNS functions on the display unit 140 through a constant user interface, and a sub-routine for supporting output of SNS information of a selected item with a detailed screen. The arrangement sub-routine arranges SNS information corresponding to an SNS function list in a received order of the SNS information, non-confirmed SNS information, or SNS information that a user or the SNS server sets having a high importance to a front end or a preset location.

The data area stores data created according to use of the portable terminal 100, and may also store at least one icon and various contents according to a widget function. Moreover, the data area stores user input provided from the input unit 120 and the touch panel 143. In particular, the data area stores an account table 153 and user information. The user information may include an ID and a password as information necessary for registering a particular SNS server, and may further include photograph information and address information designated by the user, as well as other various information input by the user. At least a part of the user information may be provided according to information that a corresponding SNS server requires for user registration in a certain SNS server registration procedure. The user information may be adjusted or changed according control of the user.

The account table 153 is a table that integrates SNS functions registered by the user. For example, as shown in FIG. 3, the account table 153 may be configured to include name information, validation information, SNS ID information, SNS password information, and SNS profile photograph information of SNS functions registered by the user. The account table 153 may be used by the controller 160 in an SNS integration operation function support procedure. The controller 160 may access an SNS server supporting respective SNS functions to use an account table 153 for forming a channel for collection of the SNS information.

The controller 160 controls power supply to respective elements of the portable terminal 100 to perform an initializing procedure. Further, the controller 160 controls various signal flows for supporting an SNS integration operation function of the present invention. To provide this control, the controller 160 may include a configuration such as illustrated in FIG. 4.

Figure 4:
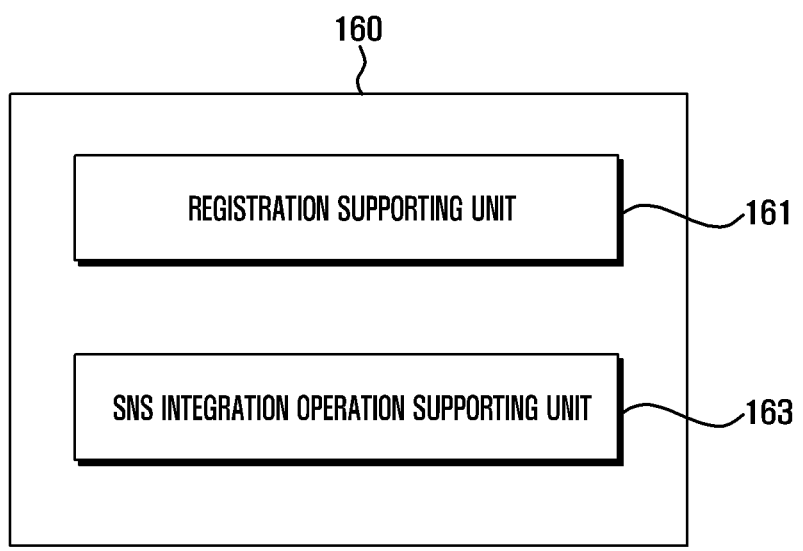
FIG. 4 is a detailed diagram illustrating a configuration of a controller according to an embodiment of the present invention.

FIG. 4 is a diagram illustrating a detailed configuration of a controller according to an embodiment of the present invention.

Referring to FIG. 4, the controller 160 includes a registration supporting unit 161 and an SNS integration operation supporting unit 163.

The registration supporting unit 161 supports a registration procedure according to subscription of a particular SNS server. The registration supporting unit 161 collects at least one SNS server list supporting a non-registered SNS function according to a request of the user or according to a default procedure. In order to collect this information, the registration supporting unit 161 supports output of a registration support user interface on the display unit 140. The registration support unit 161 may also support output of a SNS server list collected by the registration support user interface.

If a particular SNS server list is selected from the output SNS server lists, the registration support unit 161 may automatically perform a procedure for subscribing to a selected SNS server. To perform this subscription procedure, the registration support unit 161 refers to user information stored in the memory 150 and checks for information required in order to subscribe to a corresponding SNS server. More specifically, the registration support unit 161 collects information about a subscription type provided from a certain SNS server, and extracts items such as an ID and a PassWord (PW) from corresponding information. The registration support unit 161 controls the portable terminal 100 to write the information referred from the user information into the extracted item. Next, when permission from a corresponding SNS server is allowed, the registration support unit 161 transfers an SNS function list to the SNS integration operation support unit 163. When the user selects an application program necessary for subscribing to an SNS server, the registration support unit 161 downloads and installs the application program from a corresponding SNS server. The registration support unit 161 informs the user of the presence of installation of a corresponding application program through a pop-up window and/or receives confirmation from a user in order to perform installation.

The SNS integration operation support unit 163 supports various signal flows associated with SNS integration operation, output and reception of information. To support the signal flows, the SNS integration operation support unit 163 controls an SNS integration operation user interface on the display unit 140. The SNS integration operation support unit 163 checks an account table 153 stored in the memory 150 and collects at least one SNS function list registered by the user, and outputs corresponding SNS function lists through the SNS integration operation user interface. Further, the SNS integration operation support unit 163 accesses respective SNS servers corresponding to SNS function lists in order to receive SNS information from corresponding SNS servers. When separate SNS information is not updated, the SNS integration operation support unit 163 may adjust an output state of a corresponding SNS function list to a previous state. An index, image change, highlight, etc., may be used to indicate that there is updated SNS information applicable to a certain SNS function list having updated SNS information. Further, the SNS integration operation support unit 163 may apply a change in a location by distinguishing an SNS function list with updated SNS information from a list without updated information. For example, the SNS integration operation support unit 163 arranges the SNS function list with updated SNS information in an upper end of a corresponding user interface in comparison with the SNS function list without updated information or outputs the updated SNS information in a predetermined location selected by the user or otherwise easily recognized by the user.

When the user selects a certain SNS function list, the SNS integration operation support unit 163 supports output of SNS information associated with a corresponding SNS function list to the display unit 140. In this procedure, when a page switch is necessary, the SNS integration operation support unit 163 may minimize an SNS integration operation user interface and support output of the SNS information display screen on the display unit 140.

In the above-described examples, a system and a portable terminal for supporting an SNS integration operation function according to an embodiment of the present invention may integrally manage and operate a plurality of SNS servers through a single common user interface. Accordingly, the user may integrally check and manage SNS function lists subscribed by the user without the inconvenience of requiring separate access to each of a plurality of SNS servers in order to process SNS information. Furthermore, according to embodiments of the present invention the user can easily register to certain desired SNS servers for subscription.

Hereinafter, methods of supporting an SNS integration operation function according to embodiments of the present invention are described in detail with reference to the accompanying drawings.

Figure 5:
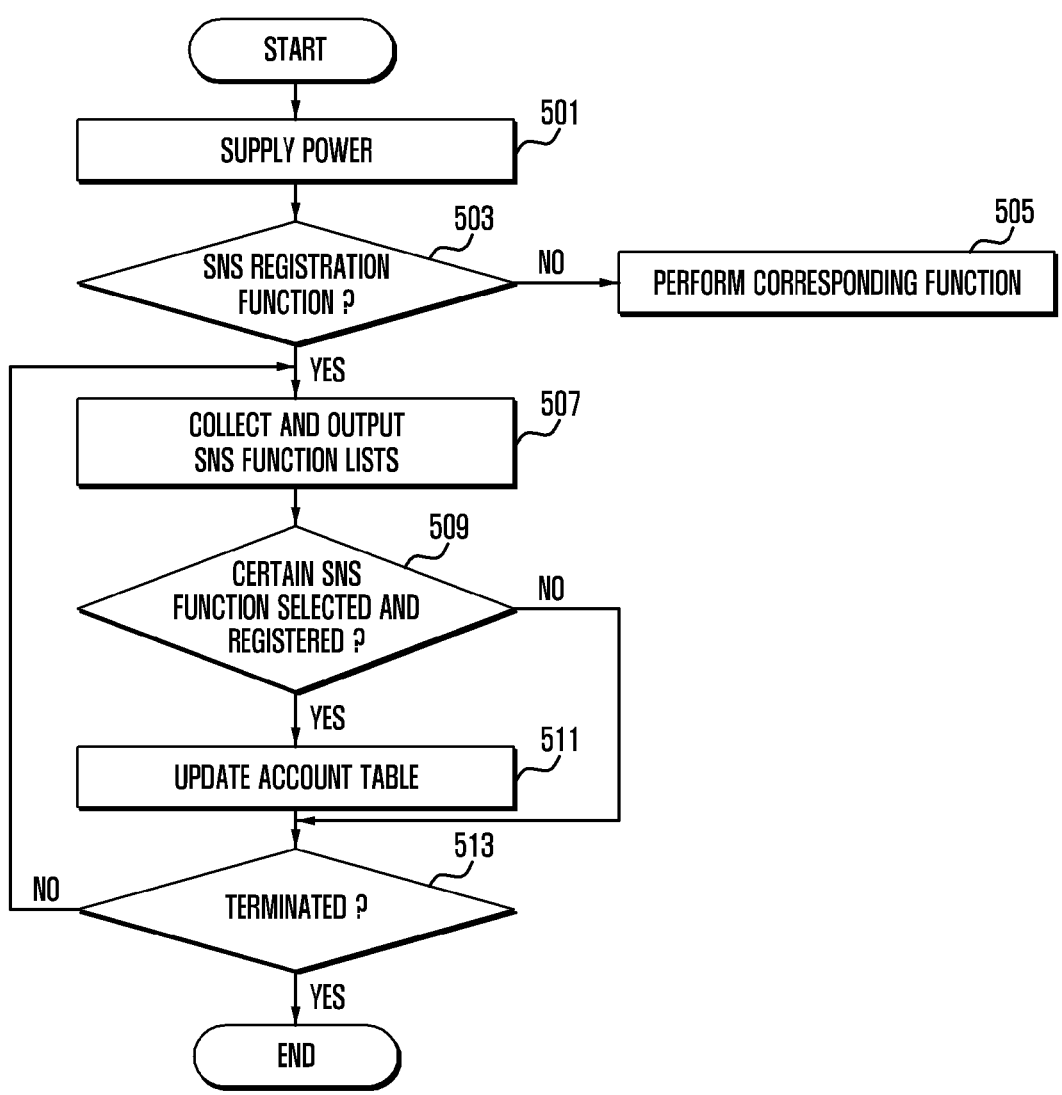
FIG. 5 is a flowchart illustrating a registration processing method of an SNS integration operation function according to an embodiment of the present invention.

FIG. 5 is a flowchart illustrating a registration processing method of an SNS integration operation function according to an embodiment of the present invention.

Referring to FIG. 5, in the registration processing method of an SNS integration operation function according to an embodiment of the present invention, a controller 160 of a portable terminal 100 supplies power from a power supply such as a battery to respective elements of the portable terminal, in step 501. In particular, the controller 160 controls power supply to respective elements for supporting an SNS registration processing, such as the RF communication unit 110 and the memory 150.

Next, if an input signal is generated, the controller 160 determines whether the input signal is a signal for activating an SNS registration function, in step 503. However, when the input signal is not a signal for activating an SNS registration function, the controller 160 supports another corresponding function according to the input signal, in step 505. For example, in step 505 the controller 160 may support such a file search function, a file playback function, a web access function, a call function, etc. of the portable terminal according to a type of the input signal.

Referring back to step 507, when the signal for activating an SNS registration function is input, the controller 160 collects and outputs SNS function lists provided from certain SNS servers, in step 507. The controller 160 checks an account table 153 stored in a memory 150 and filters only SNS function lists that have not already been registered by the user from among SNS function lists provided from SNS servers, and outputs only corresponding to the non-registered SNS function lists. The controller 160 may simultaneously output SNS functions that the user has previously registered or does not register. The controller 160 outputs a registration support user interface on the display unit 140 to support the SNS registration function, and outputs the SNS function lists to be performed through the user interface.

In step 509, the controller 160 determines whether an input signal for selection and registration of a certain SNS function is generated. More specifically, when the user generates an input signal for subscribing in a certain SNS function from an SNS function list, the controller 160 controls formation of a communication channel with an SNS server corresponding to an SNS function selected by the user and transmission/reception of information necessary for subscription, in step 511.

When the subscription procedure is terminated, the controller 160 updates an account table 153 stored in the memory 150, in step 511. More specifically, the controller 160 registers a newly subscribed SNS function in the account table 153.

Next, the controller 160 determines whether an input signal for terminating a registration function is generated, in step 513. When a separate input signal is not generated, a process returns to step 507.

Figure 6:
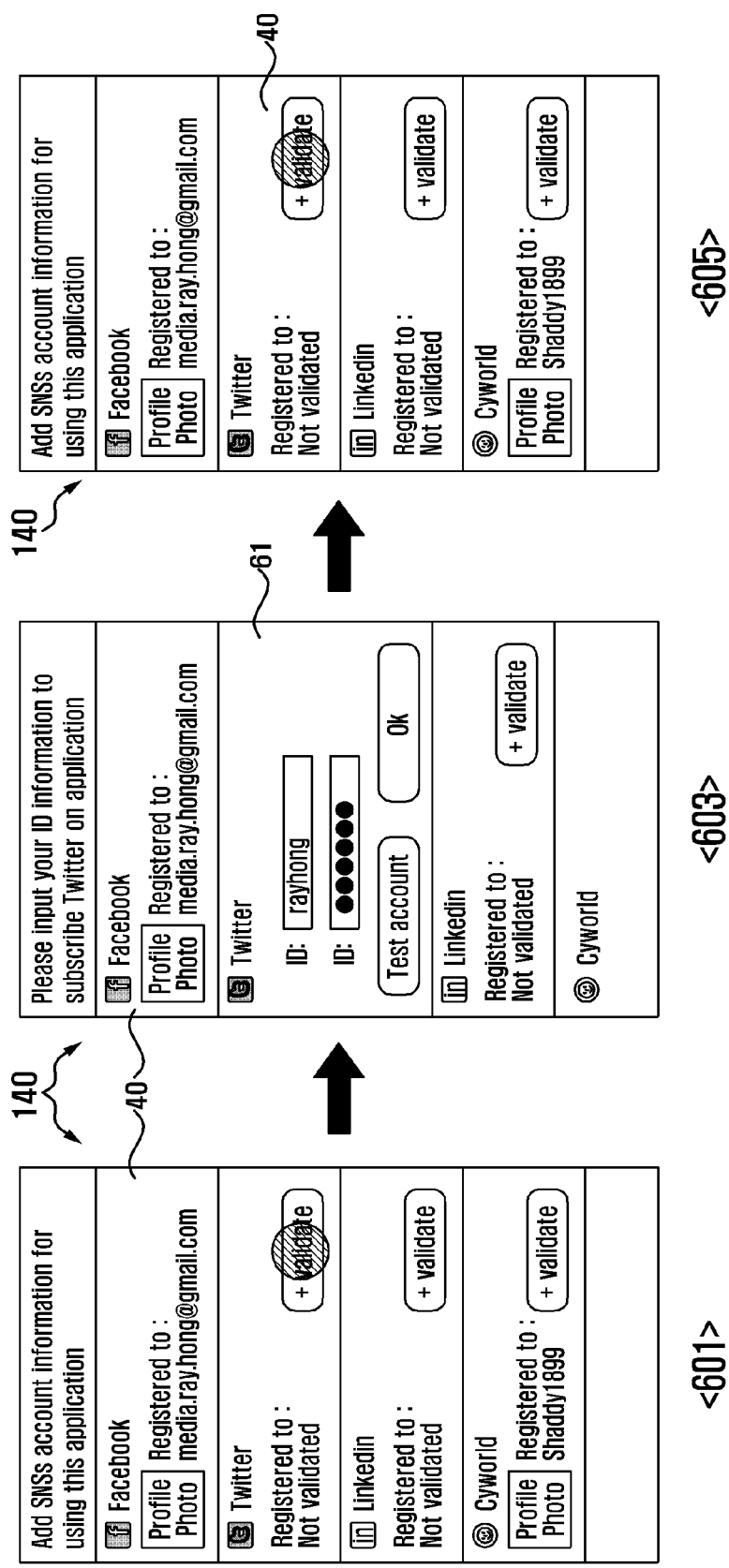
FIG. 6 is a diagram illustrating an example of a screen interface associated with an SNS registration function according to an embodiment of the present invention.

FIG. 6 is a diagram illustrating a registration support user interface in an SNS registration processing method according to an embodiment of the present invention.

Referring to FIG. 6, if the user generates an input signal for an SNS registration processing function operation, the controller 160 outputs a registration support user interface 40 including SNS function lists to a display unit 140 as illustrated in screen 601. To do this, the controller 160 collects SNS function lists provided from at least one SNS server. In this case, the controller 160 forms a communication channel with a web server having a search engine using the RF communication unit 110, and search a list of SNS servers supporting an SNS function. Further, the controller 160 collects SNS function lists provided from the searched SND servers. Meanwhile, the registration support user interface 40 outputs, not only SNS function lists, namely, lists of Twitter and LinkedIn searched by the controller 160, but also outputs SNS function lists registered by the user, for example, Facebook and Cyworld items as illustrated in screen 601 on the display unit 140.

In the meantime, the user may input, such as through a touch operation, to select a "validate" button that is output on a registration support user interface 40 in order to generate an input signal for subscribing to a corresponding non-registered SNS function list, for example, Twitter. After selecting the "validate" button, the display unit 140 outputs the registration support user interface 40 with an information input window 61 for subscribing to a corresponding SNS function, as illustrated in screen 603. The information input window 61 includes items in which subscription information such as an ID and a PW for subscribing to the corresponding SNS function are input. The user may input subscription information, such as through a touch operation, generating a confirmation input signal using the information input window 61 to process a corresponding procedure. The controller 160 may automatically input subscription information included in the information input window 61 by referring user information stored in the memory 150. In this case, the user may not perform a separate operation for registering a corresponding SNS function, and the selected SNS function may be automatically registered. If input of subscription information and permission from a corresponding SNS server are terminated, the display unit 140 outputs a registration support user interface 40 terminating registration of an SNS function selected by the user as illustrated in screen 605. In this case, the user may separately add separately information to a newly selected SNS function to upload a profile photograph. Even when there is no user request, the controller 160 may search a memory 150 to automatically register a photograph registered as user information as a profile photograph of a corresponding SNS function. In the meantime, the controller 60 registers a newly subscribed SNS function in an account table 153.

As illustrated previously, the portable terminal 100 according to an embodiment of the present invention provides a registration support user interface 40 to support a non-registered SNS function in order for the user to easily search non-registered SNS function lists, as well as allow the user to select and subscribe to non-registered SNS function lists.

Figure 7:
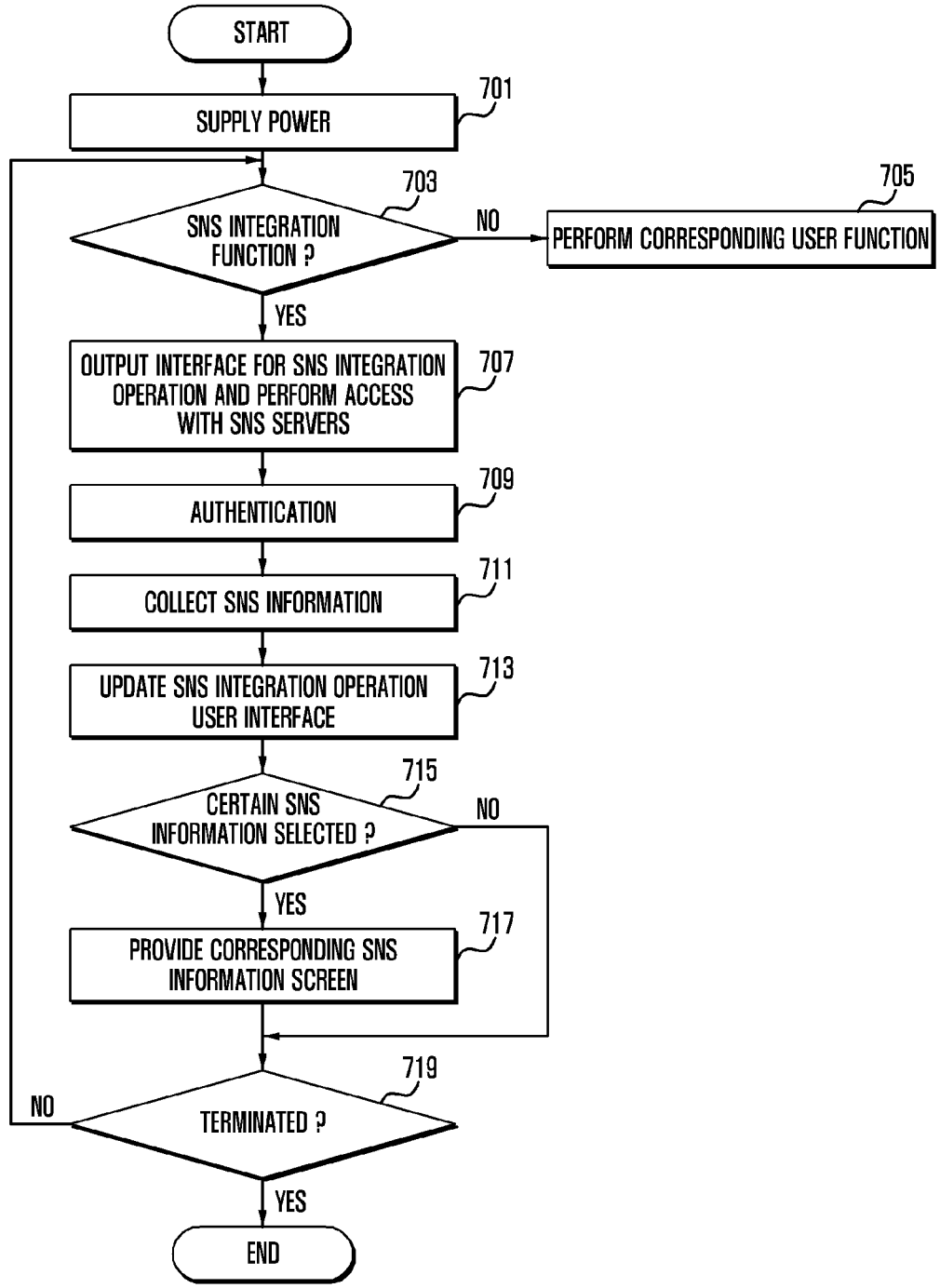
FIG. 7 is a flowchart illustrating an SNS function integration operation method according to an embodiment of the present invention.

FIG. 7 is a flowchart illustrating an SNS function integration operation method according to an embodiment of the present invention.

Referring to FIG. 7, a controller 160 of the portable terminal 100 receives power from a battery or an adapter and converts the power into power necessary for an operation of respective elements, and supplies the converted power to corresponding elements of the portable terminal 100, in step 701. In particular, the controller 160 supplies power to the input unit 120 and/or a display unit 140 having a touch screen function. If an input signal is generated in step 703, the controller 160 determines whether the input signal corresponds to an input for activating an SNS integration function, and the controller proceeds to step 707. If the generated input signal is not associated with an SNS integration function, the controller 160 performs another function corresponding to the input signal, such as a file search function, a file playback function, a broadcasting reception function, a call function, etc., in step 705.

When the input signal generated at step 703 is an input signal for supporting an SNS integration function support, the controller 160 proceeds to step 707, outputs an interface for an SNS integration operation, and accesses SNS servers corresponding to registered SNS function lists. More specifically, the controller 160 collects SNS function lists registered by the user by referring to an account table 153 stored in the memory 150. The controller 160 also simultaneously configures an SNS integration operation user interface using collected SNS function lists, collects SNS server addresses corresponding to respective SNS function lists, and forms a communication channel with respective SNS servers and attempts to access the SNS servers.

If authentication from a corresponding SNS server is obtained, in step 709, the controller 160 may collect SNS information, in step 711. It is possible that there is not any SNS information to be collected according to SNS function characteristics at this time.

However, if the SNS information is collected, the controller 160 updates an SNS integration operation user interface, in step 713. The controller 160 also outputs an indication that new SNS information is collected in an SNS function list corresponding to newly collected SNS information. Further, the controller 160 may change a location that may easily recognize an SNS function item collecting new SNS information among a plurality of SNS function lists in comparison with other items. For example, new SNS information is displayed on a certain area of the user interface, such as an upper area of the user interface, or a head of the SNS function lists, etc.

Steps 707 to 713 may be repeatedly performed with respect to each of the SNS function lists registered by the user. More specifically, the controller 160 may collect information from SNS servers corresponding to respective SNS functions and SNS information according to a predetermined defined order based upon the SNS function lists.

In step 715, the controller 160 determines whether an input signal for selecting a certain SNS function is generated from the input unit 120 or a display unit 140 of a touch screen function. When an input signal for selecting the certain SNS function is generated, the controller 160 provides a corresponding SNS information screen is provided, in step 717. More specifically, the controller 160 may provide a separate page on an SNS information screen, and switch a currently displayed page with the provided separate page. If an input signal for selecting a certain SNS function is not generated at step 715, the controller 160 skips step 717 and goes to step 719.

In step 719, the controller 160 determines whether an input signal for terminating is generated. If the termination input signal is not generated, the process returns to step 703 and repeats the above-described procedures. In this procedure, steps 707 to 711 may be repeatedly performed with a constant period or in real time. Through this repetition, the controller 160 controls an SNS integration operation user interface to output any newly collected SNS information.

Figure 8:
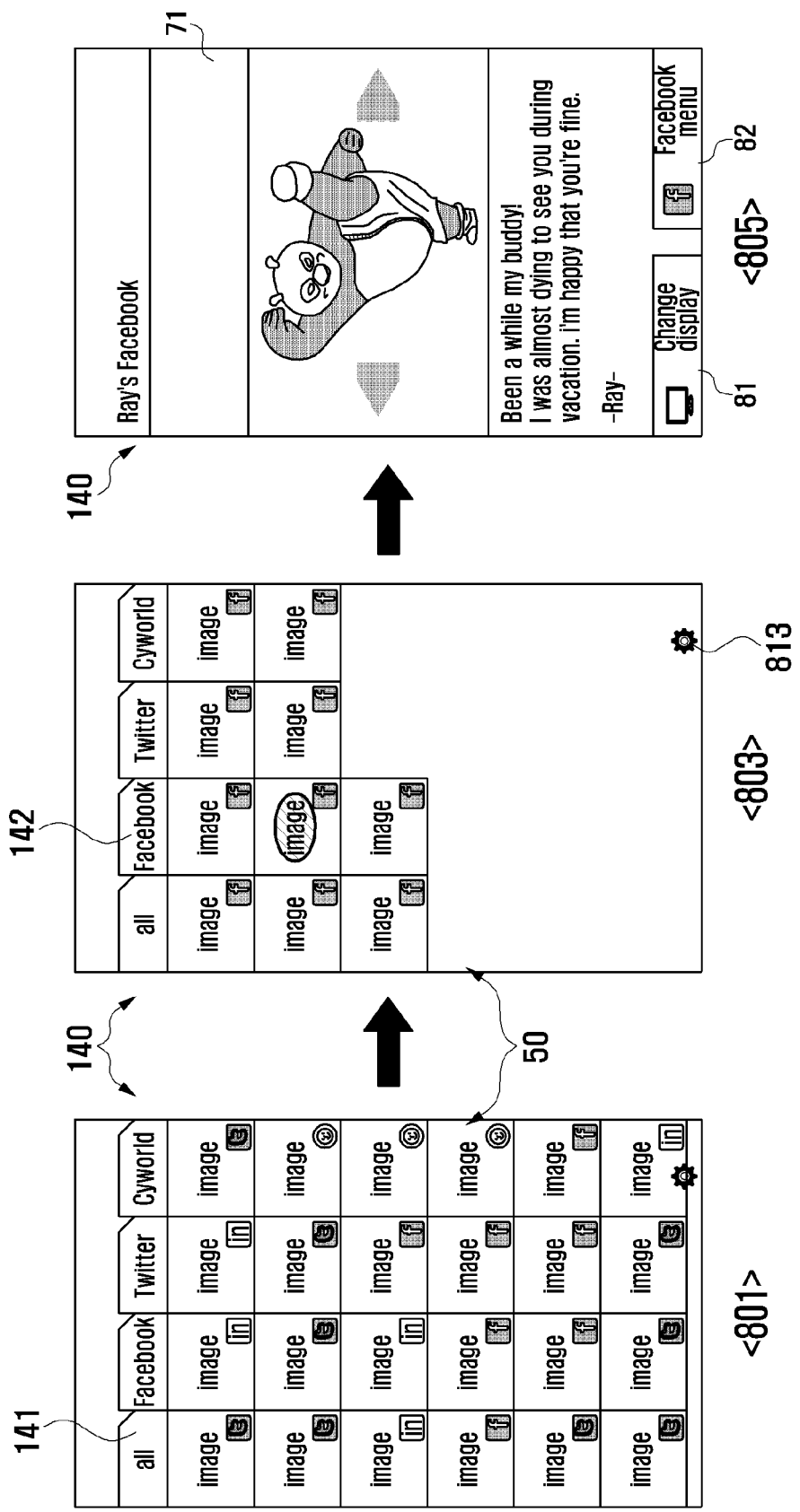
FIG. 8 is diagram illustrating an example an SNS integrated operation user interface.

FIG. 8 is diagram illustrating an example an SNS integrated operation user interface according to an embodiment of the present invention.

Referring to FIG. 8, an SNS integration operation user interface 50 according to an embodiment of the present invention includes a plurality of SNS function lists and SNS information associated with the SNS function lists. In order to generate the integration operation user interface 50, the controller 160 checks an account table stored in the memory 150, and checks SNS function lists registered in the account table to access corresponding SNS server. The controller 160 also collects SNS information from corresponding SNS servers, and outputs the SNS information to the SNS integration operation user interface 150. For example, when an SNS function lists corresponding to Facebook, Twitter, and Cyworld, for example, are registered in the account table 153, an SNS integration operation user interface 50 outputs SNS information corresponding to the registered SNS function lists. In this case, the SNS integration operation user interface 50 outputs SNS information corresponding to respective SNS function lists in a thumbnail format such that the user may easily select corresponding SNS information. In addition, the thumbnail format SNS information is output in a manner that includes texts or images such that the user may schematically recognize contents included in the SNS information. In the meantime, the SNS integration operation user interface 50 provides an "all" category tab 141, which an item corresponding to all of the collected SNS information from the registered SNS function lists. When the user selects the "all" category tab 141, or if this tab is selected by default, all of the SNS information is output on a screen, such as illustrated in a screen 801. In particular, SNS information located at an upper end of a screen in which the "all" is selected may correspond to modern information in comparison with other information. Through the SNS integration operation user interface 50, SNS information that is more recently collected is arranged such that it is prioritized in the display, in order for a user to easily select and confirm new SNS information.

In the meantime, when the user selects a "Facebook" category tab 142 on screen 801, the SNS integration user interface 50 outputs SNS information corresponding to the "Facebook" category, such as illustrated in screen 803. In the present example, the SNS integration operation user interface 50 outputs the SNS information corresponding to the "Facebook" category in a thumbnail format. In addition, screen 803 outputs a button map for setting account information in a constant region located at a lower right side of a screen, for example.

When the user generates an input signal selecting certain SNS information on screen 803, the controller 160 outputs the first SNS information screen 71, such as illustrated in screen 805. Text information and image information included in the SNS information are output on the first SNS information screen 71. A selection button map for searching another SNS information are also output on a side of the first SNS information screen 71. The user may generate other items corresponding to the "Facebook" category, for example, an input signal for searching SNS information adjacent to SNS information selected from screen 803.

The first SNS information screen 71 may be switched to a screen outputting another SNS information. A first button map 81 for outputting the SNS information to another electronic device is displayed in a side, for example, a lower left side of the first SNS information screen 71. A second button map 82 approaching an SNS function menu associated with the first SNS information screen 71 which is currently output may be output in a side, for example, a lower right end of the screen.

Figure 9:
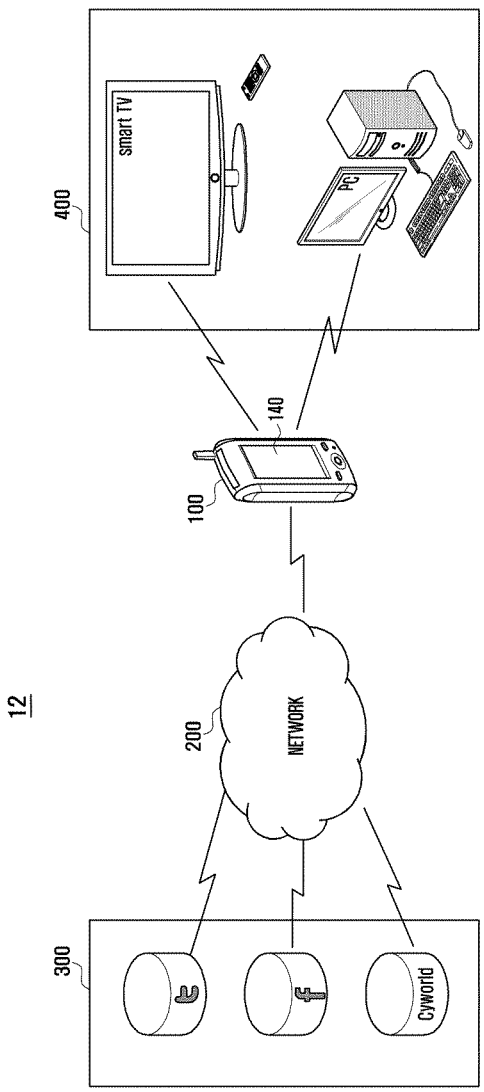
FIG. 9 is a diagram illustrating a configuration of an SNS function integration operation system according to an embodiment of the present invention.

FIG. 9 is a diagram illustrating an integrated operation system of an SNS function according to an embodiment of the present invention.

Referring to FIG. 9, a second SNS function integration operation system 12 according to another embodiment of the present invention includes a portable terminal 100, a network 200, a plurality of SNS servers 300, and at least one electronic device 400.

In the second SNS function integration operation system 12, the portable terminal 100 receives SNS information provided from the plurality of SNS servers 300, and the received SNS information and various user interfaces supported from the portable terminal 100 are output to at least one electronic device 400. More specifically, the second SNS function integration operation system 12 outputs, to the electronic device 400, an SNS integration operation user interface optimized for the electronic device 400, such that image quality and the screen size of an SNS information screen are based on device information of the electronic device 400.

When the user activates a first button map 81 to output a first SNS information screen 71 or an SNS integration operation user interface 50 to another electronic device 400, the portable terminal 100 searches electronic devices 400 capable of receiving the output information. In order to perform this search, the portable terminal 100 and the at least one electronic device 400 establish a communication channel based on various communication types based on a near distance communication module, a wired communication module, and a wireless communication module. For example, the portable terminal 100 and the electronic device 400 may be set such that transmission, reception, and output of data are performed according to a communication scheme such as Universal Plug and Play (UPnP) or Digital Living Network Alliance (DLNA) communication schemes, for example.

In the meantime, the portable terminal 100 collects a list of each electronic device 400 capable of outputting SNS function relation information through a peripheral search, and outputs the collected list on the display unit 140. When the user selects at least one particular electronic device 400, the portable terminal 100 transmits information associated with an SNS function, namely, an SNS integration operation user interface and data corresponding to at least one of SNS information screens to the selected electronic device 400.

The portable terminal 100 newly requests, from an SNS server 300 providing SNS information, information to be output to a corresponding electronic device 400. In order to perform this request, the portable terminal 100 collects device information of a corresponding electronic device 400 and transmits the collected device information to an SNS server 300. When forming a communication channel with the portable terminal 100 or requesting the portable terminal 100, the electronic device 400 may transfer its own device information to the portable terminal 100. The device information of the electronic device 400 may include information such as resolution information, screen size information, audio support information, and text output support information, etc. Upon receiving, from the portable terminal 100, device information and an SNS information transmission request corresponding to the device information, the SNS server 300 providing the SNS information reconfigures optimized information for the corresponding electronic device 400 according the request and the received device information.

The SNS server 300 transfers the reconfigured/optimized SNS information to the portable terminal 100. For example, the SNS server 300 may provide, to the portable terminal 100 for use by an electronic device 400, image information having higher resolution and audio information having higher quality than that of SNS information provided to the portable terminal 100 for use by the portable terminal 100. The SNS server 300 may transmit, to the portable terminal 100, SNS information including original files at a registration time having quality and the size registered in an initial server without transforming the SNS information into a form suited to a screen of the portable terminal 100. If the portable terminal 100 receives SNS information configured to be applied to the electronic device 400 or SNS information with original files, the portable terminal 100 may transfer the received SNS information to a corresponding electronic device 400.

Upon receiving SNS information, the electronic device 400 may output the received SNS information on a screen of the electronic device 400 and/or output audio information if audio information is included in the SNS information. In order to output the received SNS information, the electronic device 400 may output the second SNS information screen 72 along with audio information, for example. When receiving an SNS integration operation user interface 50 from the portable terminal 100, the electronic device 400 outputs a corresponding SNS integration operation user interface 50 on a screen. In this case, the portable terminal 100 adjusts and transfers, to the electronic device 400, the SNS integration operation user interface 50 according to device properties such as a screen size, a resolution, an aspect ratio, etc. of the electronic device 400. Accordingly, the electronic device 400 outputs the SNS integration operation user interface 50 suited to its screen size.

Meanwhile, when SNS information of a thumbnail format corresponding to the SNS integration operation user interface 50 are output to the electronic device 400, the thumbnail formatted SNS information may be adjusted and transferred to the electronic device 400 according to the size, resolution, and ratio suited to the electronic device 400. Further, when SNS information of the thumbnail format is extended in size in order to be displayed by the electronic device 400, the SNS thumbnail formatted information may be configured according to image information included in corresponding SNS information or a thumbnail image with text information. The SNS integration user interface 50 is configured into a format for displaying a plurality of thumbnail images. As a result, the SNS integration operation user interface 50 outputs on the display unit 240 of the portable terminal 100 has a form similar to an interface output on the display unit 140 of the portable terminal 100, but is changed to a screen suited to the electronic device 400. Accordingly, the user may easily confirm and search various SNS information through the electronic device 400.

FIG. 10 is a diagram illustrating screen interfaces supporting an SNS integration operation function according to another embodiment of the present invention.

Referring to FIG. 10, when outputting a screen corresponding to SNS information selected by user, as illustrated in screen 1001, a display unit 410 of the portable terminal 100 outputs, on a side of screen 1001, a first button map 81 for switching output of the SNS information to another electronic device 400. The user selects the first button map 81 to perform a screen switch to another electronic device 400. If the first button map 81 is activated, the controller 160 searches for peripheral electronic devices 400 to display the SNS information. When the search for the peripheral electronic devices 400 concludes, a list of the found electric devices is output on the display unit 140 as illustrated in screen 1003.

A user of the portable terminal user selects a particular electronic device for changing the display output (e.g., TV 400) from an electronic device list. Accordingly, if the television 400 is selected the controller 160 of the portable terminal 100 transmits the first SNS information screen 71 is transmitted to a TV 400. In order to transmit the SNS information to the controller 160 establishes a communication channel with the TV 400 and transmits the SNS information to the TV 400. The controller 160 collects device information of the selected TV 400, and supports output of a second SNS information screen 72. More specifically, the controller 160 configures and transmits, to the TV 400 a second SNS information screen 72 corresponding to the size, resolution, and aspect ratio of the TV 400 screen. In this procedure, when SNS information with different display characteristics is necessary, the controller 160 may request it to an SNS server requiring corresponding SNS information. The controller 160 changes at least one of the screen size, the resolution, and the aspect ratio of the SNS information received from the SNS servers 300 before transmitting the changed SNS information to the TV 400. As a result, the second SNS information screen 72 outputs on screen 1007 is similar to the first SNS information screen 71 output on screen 1001, even though the particular arrangement of information, the screen size, the resolution, and the aspect ratio thereof may differ from the first SNS information screen 71. In the present example, the SNS server 300 confirms the device information. When the TV 400 does not have a separate text output function, the SNS server converts output text information into image information and transmits the image information to the TV 400 through the portable terminal 100.

According to an alternative embodiment of the present invention, the controller 160 does not request, from the SNS server 300, SNS information suited to the device information corresponding to the TV 400. Instead, the portable terminal 100 processes and transmits the received SNS information to the TV 400. More specifically, when providing SNS information, the SNS server 300 may provide SNS information with the screen size and/or image quality corresponding to device information of the portable terminal 100. Upon receiving the SNS information, the controller 160 of the portable terminal 100 processes the size, resolution, and the aspect ratio of the SNS information, such that the processed SNS information is suited to a display unit 140 of the portable terminal 100 to output the received SNS information on the display unit 140. That is, the controller 160 processes the received SNS information such that the received SNS information is suited to a display unit 140 of the portable terminal 100 and outputs the processed SNS information to the display unit 140. The SNS server also provides original non-processed SNS information having a predetermined screen size, resolution, and aspect ratio, namely, original non-processes SNS information to the portable terminal 100. Accordingly, upon receiving the original non-processed SNS information from the SNS server, the controller 160 reprocesses the SNS information in a manner suited to a screen of the TV 400, and transmits the reprocessed SNS information to the TV 400. In this procedure, the controller 160 confirms device information of the TV 400. When the TV 400 does not have a separate text output function, the controller 160 converts the output text information into image information, and transmits the image information to the TV 400.

The controller 160 of the portable terminal transmits the second SNS information screen 72 to the TV 400 and a screen interface for controlling the TV 400 is output to the display unit 140. For example, when the display unit 140 supports a touch screen function, the display unit 140 outputs a control map for receiving user input to generate an input signal according to a touch operation as illustrated in screen 1005. In response to a particular user input to the touch screen display according to the mapping, the controller 160 changes a second SNS information screen 72 to be transmitted to the TV 400. More specifically, the controller 160 selects another SNS information according to the input signal, and the selected SNS information is converted into a screen suitable for the TV 400. The controller 160 subsequently transmits the converted SNS information to the TV 400.

The above-described SNS function integration operation system 12 according to another embodiment of the present invention transmits a screen interface according to an SNS integration operation function of the portable terminal 100 to another electronic device 400 such that the another electronic device 400 outputs the transmitted screen interface. In particular, the second SNS function integration operation system 12 adaptively changes and transfer the screen interface associated with the SNS integration operation function to the corresponding electronic device 400 in order to simplify a user search for information according to the SNS integration operation. According to the foregoing embodiment, a screen is switched from the portable terminal 100 to the electronic device 400 when the first SNS information screen 71 is output on a display unit 140 of the portable terminal 100. However, embodiments of the present invention are not limited to this example. For example, other screens, such as shown in screens 801 and 803 illustrated in FIG. 8, may be switched to the electronic device 400. In order to perform this switching, the portable terminal 100 includes a button mapping for switching screen 801 or 803 to another electronic device 400. Further, according to the foregoing embodiment of the present invention, the second SNS information screen 72 is output to an electronic device 40 as an example. However, embodiments of the present invention are not limited to this example, and the foregoing SNS integration operation user interface may be output to the electronic device 400 according user controls in accordance with embodiments of the present invention.

Figure 11:
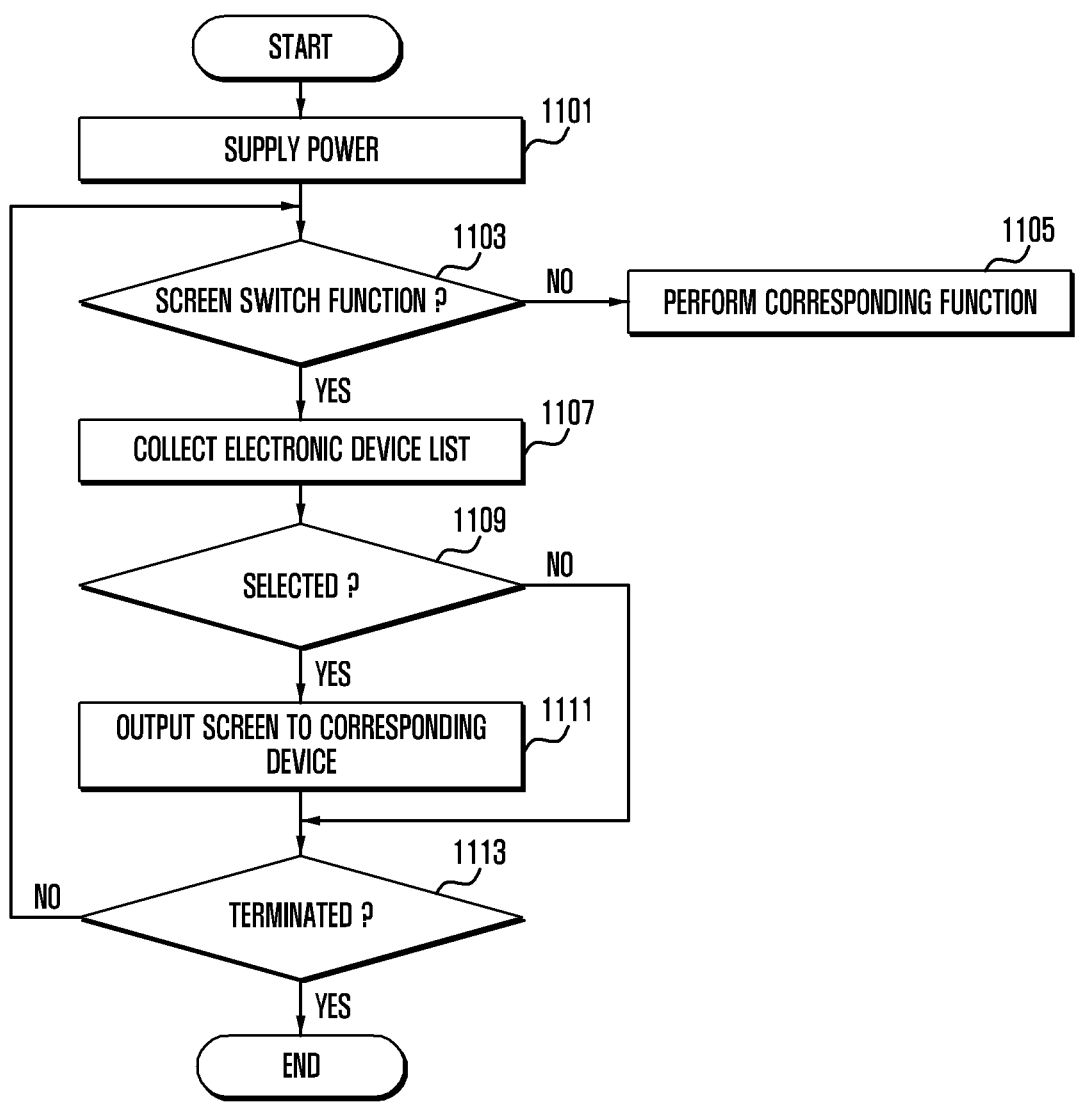
FIG. 11 is a flowchart illustrating an SNS function integration operation method according to another embodiment of the present invention.

FIG. 11 is a flowchart illustrating a screen switch function support method of an SNS integration operation function method according to another embodiment of the present invention.

Referring to FIG. 11, a controller 160 of the portable terminal 100 receives power from a battery or an adapter and converts the power into power necessary for an operation of respective elements, and supplies the converted power to corresponding elements of the portable terminal 100, in step 1101. In particular, the controller 160 supplies suitable power to the input unit 120 and/or the display unit 140 in order to provide a touch screen function. The display unit 140 of the portable terminal 100 displays an SNS integration operation user interface or an SNS information screen according to a selection of SNS information output on a corresponding user interface. The display unit 140 also outputs a button map for switching a screen of an output screen interface to another electronic device 400.

If an input signal is generated, the controller 160 determines whether the input signal is for a screen switch function, in step 1103. More specifically, the controller 160 determines whether an input signal corresponding to button map output on the display unit 140 is generated. When an input signal does not correspond to the screen switch function, the controller 160 performs another function according to the input signal, such as an SNS information search function provided from an SNS integration operation user interface or an SNS function operation through access of a certain SNS server, in step 1105. The SNS function operation includes a accessing a corresponding SNS server 300 to transmit SNS information or transmit the SNS information to another terminal 400. When an input signal corresponding to the screen switch function is generated at step 1103, the controller 160 collects a list of electronic devices capable of receiving a screen switched over from the portable terminal 100, in step 1107. In order to collect the list, the controller 160 searches at least one peripheral electronic device 400 based on a wireless and/or wired communication schemes. The controller 160 outputs the electronic device list to the display unit 140.

The controller 160 determines whether an input signal for selecting a certain electronic device 400 is generated, in step 1109. Upon detecting a generated input signal for selecting the certain electronic device 400, the controller 160 outputs a screen to the corresponding device 400, in step 1111. The screen output to the electronic device 400 may be at least one of an SNS information screen and an SNS integration operation use interface. In meantime, the controller 160 processes a screen output to a corresponding electronic device 400 based on device information of the corresponding electronic device 400. More specifically, the controller 160 configures a screen with the size, a resolution, and an aspect ratio suited to a screen of a corresponding electronic device 400. Moreover, when receiving SNS information with a resolution and a screen size of an original file, the controller 160 may transfer corresponding SNS information to the electronic device 400.

Further, the controller 160 outputs, to the display unit 140, a control map for controlling a screen output to the electronic device 400, as illustrated in screen 1005. However, when there is no selection input signal detected, the controller 160 skips step 1111, where the controller performs a screen switch function according to a sequence described as follows.

In step 1113, the controller 160 determines whether an input signal for terminating the screen switch function is generated. If an input signal for terminating the screen switch function is not generated, the process returns to step 1103.

As illustrated and described herein, a screen switch function operates according to an to provide a screen output from the portable terminal 100 with a limited display unit 140 through an electronic device 400 of an extended form (such as a larger display, for example), in order for a user to easily perform an information search and perform other control operations related to the SNS information.

An electronic device 400 according to embodiments of the present invention may configure an SNS integration operation user interface based on thumbnail images corresponding to SNS information with respect to a procedure for outputting an SNS integration user interface and an SNS information screen output to the portable terminal 100 in a manner similar to a function for providing a screen interface in the portable terminal 100. Further, the electronic device 400 may arrange thumbnail images, such as images corresponding to recent received SNS information or non-confirmed SNS information of SNS information, SNS information that a user or an SNS server sets as having a high priority, in a screen location that is easily recognizable and selectable by the user. For example, such screen locations may include upper ends or centers of corresponding thumbnail image lists.

The portable terminal 100 may further include various additional modules to provide certain features. For example, when the mobile terminal 100 is a communication terminal, the portable terminal 100 may include additional constructions that are not described hereinabove, such as a near field communication module for near field communication, an interface exchanging data in a wired communication scheme or a wireless communication scheme of the mobile terminal 100, an Internet communication module communicating with an Internet to perform an Internet function, and a digital broadcasting module receiving and broadcasting digital broadcasting. Since structural elements of a portable terminal 100 can be variously changed according to convergence trends of digital devices, the portable terminal 100 may include structural elements equivalent to the foregoing structural elements.

The portable terminal 100 according to an embodiment of the present invention may include various types of devices supporting a SNS function, such as an information communication device and a multimedia device such as a Portable Multimedia Player (PMP), a digital broadcasting player, a Personal Digital Assistant (PDA), a music player (e.g., an MP3 player), a portable game terminal, a Smart Phone, a notebook computer, and a handheld Personal Computer (PC), as well as various mobile communication terminals operating based on communication protocols corresponding to various communication systems.

As mentioned above, an SNS function integration operation method and a system thereof according to embodiments of the present invention integrally manage and operation a plurality of SNS functions, and provide a screen for SNS function support through various electronic devices such that a screen for SNS function support may be searched by a user.

Although embodiments of the present invention are described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A portable terminal for providing a Social Network Service (SNS) function integration operation, the portable terminal configured to:
   receive a plurality of SNS information corresponding to a plurality of SNS functions, from a plurality of SNS servers;
   output an SNS integration operation user interface that integrates the plurality of SNS information and displays each of the plurality of SNS information in a thumbnail format;

output an SNS information screen corresponding to a detailed view of one of the SNS information selected from the plurality of SNS information; and when an input signal is received for output to an external electronic device, provide, to the external electronic device, at least one of a second SNS integration operation user interface that integrates the plurality of SNS information and displays each of the plurality of SNS information in the thumbnail format and a second SNS information screen corresponding to the detailed view of the selected SNS information, wherein, the second SNS integration operation user interface and the second SNS information screen are configured according to device information of the external electronic device, and wherein the portable terminal collects the device information associated with a screen size and audio capability of the external electronic device, and provides the collected device information to the plurality of SNS servers.

2. The portable terminal of claim 1, wherein the portable terminal comprises:
a display unit for outputting the SNS integration operation user interface and the SNS information screen;
a radio frequency communication unit for forming a communication channel for collecting the plurality of SNS information from the plurality of SNS servers; and
a controller collecting the plurality of SNS information and outputting the collected SNS information to the SNS integration operation user interface.

3. The portable terminal of claim 2, wherein the portable terminal further comprises a memory for storing an account table including information with respect to subscribed SNS functions among the plurality SNS functions provided from the plurality of SNS servers, and
wherein the controller collects SNS information from SNS servers corresponding to a list of SNS functions registered in the account table, and outputs a thumbnail image corresponding to recently collected SNS information to a predetermined location of the SNS integration operation user interface.

4. The portable terminal of claim 1,
wherein the plurality of SNS servers configure at least one of the second SNS integration operation user interface and the second SNS information screen having at least one of the screen size, a resolution, an aspect ratio, and a sound quality corresponding to the collected device information, and
wherein the portable terminal receives, from the plurality of SNS servers, and provides, to the external electronic device, at least one of the second SNS operation user interface and the second SNS information screen configured corresponding to the collected device information.

5. The portable terminal of claim 1, wherein the SNS information is provided by the plurality of SNS servers, and the plurality of SNS information is configured according to at least one of a screen size, a resolution, an aspect ratio, and a sound quality of an original file when the portable terminal registers the external electronic device with the plurality of SNS servers.

6. The portable terminal of claim 5, wherein the portable terminal collects device information associated with at least one of a screen size and audio capability of the external electronic device, from the external electronic device, reconfigures and provides, to the external electronic device, at least one of the second SNS integration operation user interface and the second SNS information screen with the SNS information configured according to the screen size, a resolution, an aspect ratio, and a sound quality corresponding to the device information.

7. A method for providing a Social Network Service (SNS) function integration operation by a portable terminal, the method comprising:
receiving, from a plurality of SNS servers, a plurality of SNS information corresponding to a plurality of SNS functions;
outputting an SNS integration operation user interface that integrates the plurality of SNS information and displays each of the plurality of SNS information in a thumbnail format;
outputting an SNS information screen corresponding to a detailed view of one of the SNS information selected from the plurality of SNS information;
when an input signal is received for output to an electronic device, transferring at least one of a second SNS integration operation user interface user interface that integrates the plurality of SNS information and displays each of the plurality of SNS information in the thumbnail format and a second SNS information screen corresponding to the detailed view of the selected SNS information,
wherein, the second SNS integration operation user interface and the second SNS information screen are configured according to device information of the electronic device, and
wherein the transferred at least one of the second SNS integration operation user interface and the second SNS information screen is displayed in the electronic device, and
wherein the portable terminal collects the device information associated with a screen size and audio capability of the electronic device, and provides the collected device information to at least one SNS server.

8. The method of claim 7, further comprising:
providing a SNS registration support user interface for subscribing to the plurality of SNS servers.

9. The method of claim 7, wherein transferring, to the electronic device by the portable terminal, the at least one of the second SNS integration operation user interface and the second SNS information screen comprises configuring and outputting, to the second SNS integration operation user interface, the plurality of SNS information with the thumbnail image.

10. The method of claim 7, wherein transferring, to the electronic device by the portable terminal, the at least one of the second SNS integration operation user interface and the second SNS information screen comprises outputting, to a predetermined location of the second SNS integration operation user interface, a thumbnail image corresponding to recently collected SNS information.

11. The method of claim 7, further comprising storing information with respect to subscribed SNS functions among the plurality of SNS functions provided from the plurality of SNS servers in an account table,
wherein receiving the plurality of SNS information comprises:
simultaneously accessing each of the plurality of SNS servers corresponding to a list of SNS functions registered in the account table in a sequence according to the list of SNS functions; and
receiving the plurality of SNS information from the accessed SNS servers.

12. The portable terminal of claim 6, wherein the portable terminal provides a control map for controlling the output to the external electronic device of at least one of the second SNS integration operation user interface and the second SNS information screen.

13. The method of claim 7,
wherein at least one of the second SNS integration operation user interface and the second SNS information screen is configured by the at least one SNS server, and
at least of the second SNS integration operation user interface and the second SNS information screen is configured according to at least one of the screen size, a resolution, an aspect ratio, and a sound quality corresponding to the collected device information.

14. The method of claim 13, wherein displaying the transferred at least one of the second SNS integration operation user interface and the second SNS information screen comprises receiving and displaying, by the electronic device, at least one of the second SNS integration operation user interface and the second SNS information screen configured corresponding to the device information.

15. The method of claim 7, wherein receiving the plurality of SNS information comprises receiving the plurality of SNS information configured according to at least one of a screen size, a resolution, an aspect ratio, and a sound quality of an original file when the portable terminal registers the electronic device with the plurality of SNS servers.

16. The method of claim 15, further comprising:
collecting device information associated with at least one of a screen size and audio output of the electronic device; and
reconfiguring at least one of the second SNS integration operation user interface and the second SNS information screen with the SNS information configured according to the screen size, a resolution, an aspect ratio, and a sound quality corresponding to the device information based on the plurality of SNS information configured by a file received at a time of registration of the electronic device.

17. The method of claim 16, wherein displaying the transferred at least one of the second SNS integration operation user interface and the second SNS information screen comprises displaying, by the electronic device, at least one of the reconfigured second SNS integration operation user interface and the second SNS information screen corresponding to the device information from the portable terminal.

18. The method of claim 17, further comprising displaying a control map for controlling the output to the electronic device by the portable terminal.

* * * * *